JACQUES PRADON

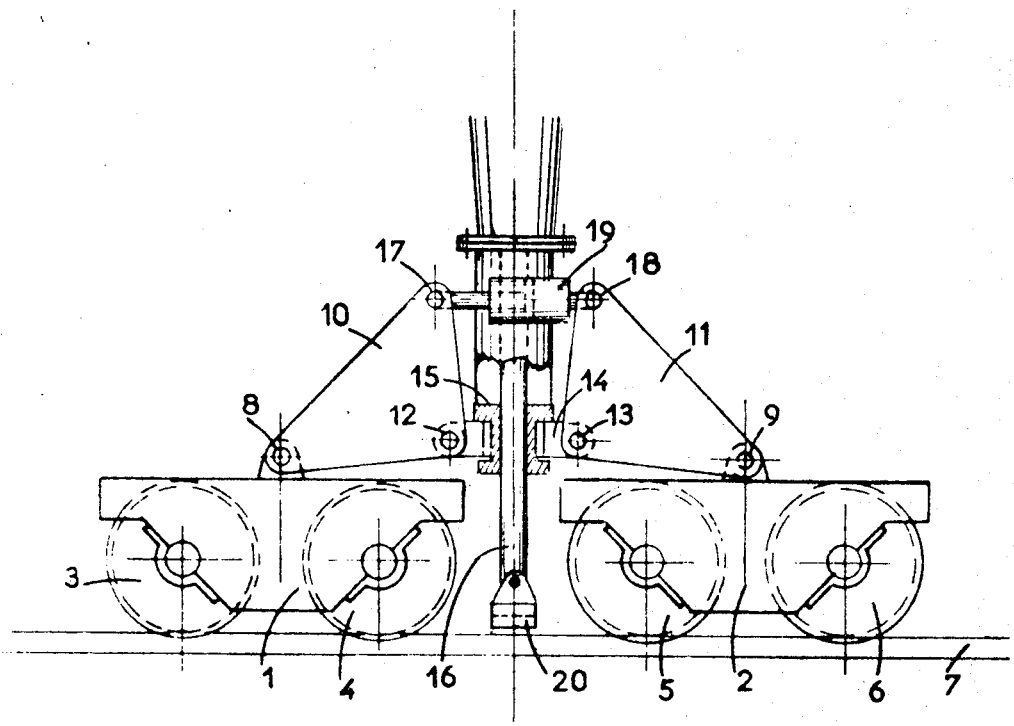
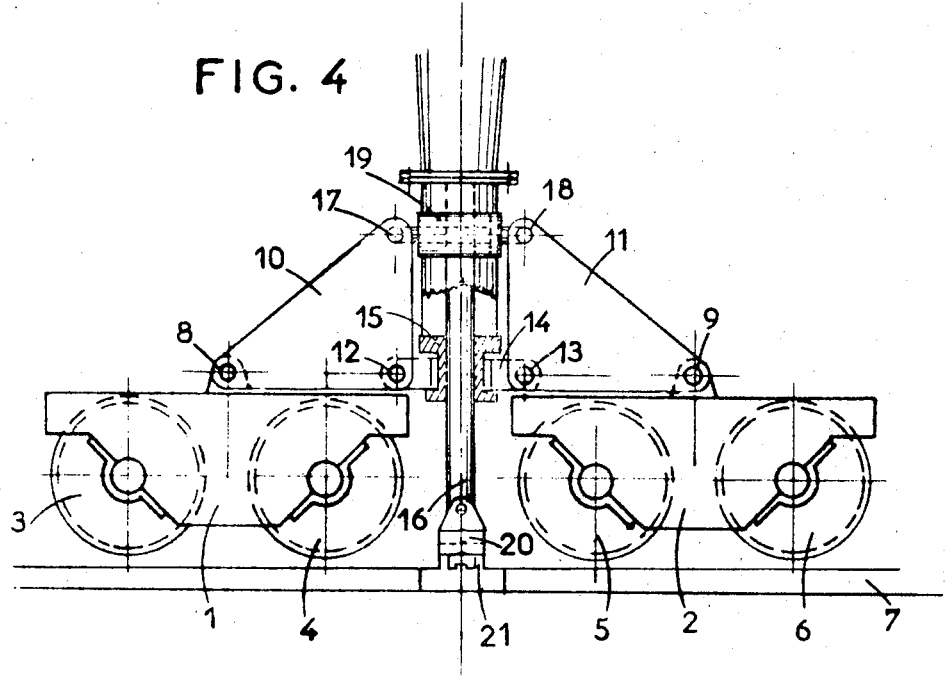

JACQUES PRADON

| United States Patent Office | 3,450,062 |
|---|---|
| | Patented June 17, 1969 |

3,450,062
MULTIDIRECTIONAL TRUCK
Jacques Pradon, 19 Ave. de la Tourelle,
St-Maur-des-Fosses 94, France
Filed July 1, 1966, Ser. No. 562,363
Claims priority, application France, July 1, 1965,
23,114
Int. Cl. B61k 5/02; B61f 5/00
U.S. Cl. 105—177    3 Claims

ABSTRACT OF THE DISCLOSURE

The disclosure is concerned with a rail vehicle truck arranged for transferring the truck between trackways intersecting perpendicularly in which the truck is supported on four legs positioned to be vertically aligned with the intersection points of the track rails, with each leg being provided with a pair of bogies that ride on the respective track rails and include a jacking arrangement to rest the truck on its legs and raise the bogie wheels above the track rails. The bogies of each leg are mounted to be swung about the respective legs when freed from the track rails so that transfer of the truck between the intersecting tracks can readily take place, when the truck rests on its legs at the rail intersection points, by rotating the respective bogies from alignment with one trackway to the other, and then restoring the weight of the truck and its load to the truck bogies. The jacking arrangement also includes a control device so that the truck may be leveled when the trackway is on uneven ground.

---

The invention has for its subject a suspension arrangement for a truck of the type that mounts a machine on railroad tracks.

The trucks of some machines, and for example of machines for the handling of products, must be capable of varying the height of the suspension for compensating the inequalities of the rail tracks or of the ground on which they travel. This must be done without permitting deformation in the structure of the trucks and while maintaining the machines horizontal even if the ground on which they travel is not absolutely level.

The invention has for its subject a simple suspension arrangement allowing it to comply with the conditions mentioned above.

According to the invention, the truck is supported by several traveling sets of wheels, each set comprising an assembly at least two wheels placed one behind the other, both wheels being fitted on a part pivoting around a horizontal spindle, parallel to the wheel axle, the two pivoting parts being connected by a hydraulic jack, with the assemblies being rotatable, when lifted free of the track rails, to rotate about a vertical axis.

The invention shall now be described with more details, referring to a particular application given as example and represented on the drawings.

In the following description the supplementary characteristics of the invention shall be given.

FIGURE 1 is an elevational view, partially in section, of a travelling wheel set or assembly set according to the invention, this set comprising in its center a vertical leg fitted on the truck, which can rest on the rail track, permitting one to lift the wheels so that they may be shifted from a rail track to another one, for example, perpendicular thereto; the position shown is when the assembly is positioned on one of the trackways spaced from the position of FIGURE 5;

FIGURES 2, 3, and 4 are similar to the FIGURE 1, the hydraulic jack connecting the two pivoting parts on which the wheels are fitted being shown in various positions;

Figure 1:
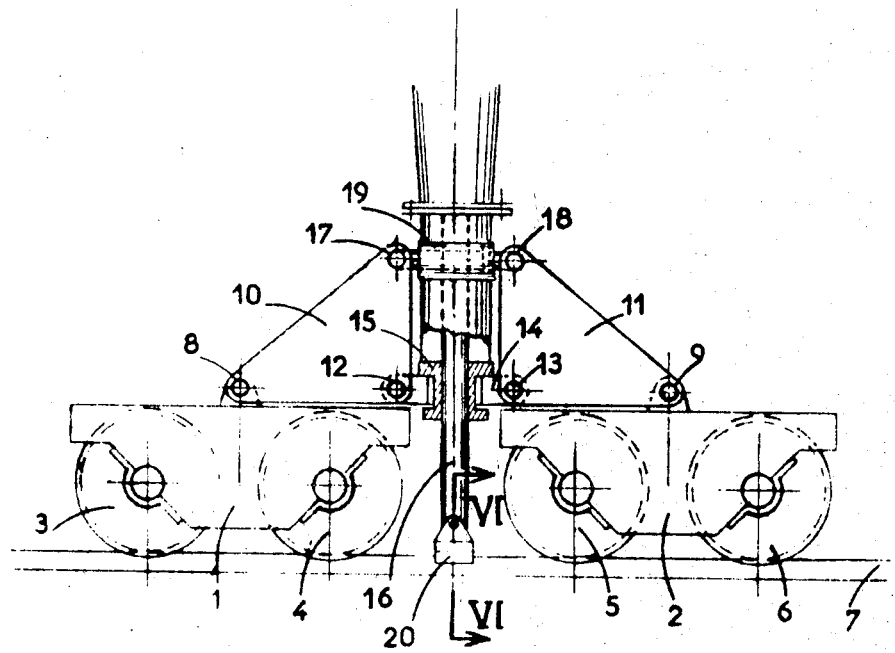

The figures illustrate the case of a truck A, comprising a frame B, moving on rails and constituting for example the support of a gantry that in accordance with this invention is in effect mounted on four legs.

The travelling sets or assemblies are each constituted by two bogies 1 and 2, each of them provided with two wheels 3 and 4, 5 and 6. All the wheels of this travelling set run on one rail 7 and the four travelling sets of the truck run on two parallel rails 7 that form a trackway.

Each bogie 1 and 2 is hinged by a spindle 8, 9 on a pivoting part or bell crank 10 or 11.

Each part 10 or 11 pivots around a spindle 12 or 13 fitted on a part 14 which can rotate about a vertical axis in a ring 15 fitted on a vertical leg 16 connected to the truck and supporting same in the position of FIGURE 4.

Figure 2:
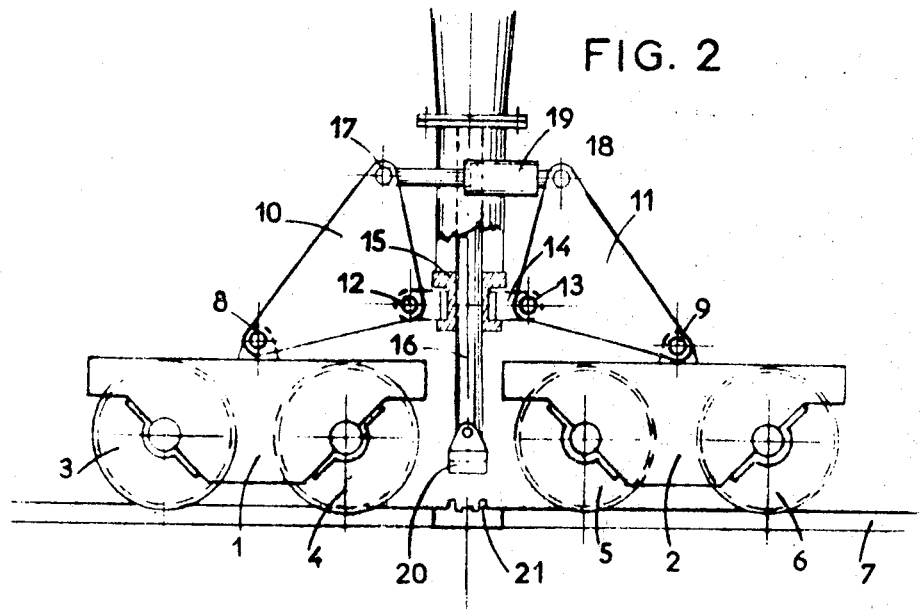

Two spindles 17 and 18 fitted on the hinging parts 10 and 11 are connected by a hydraulic jack device 19 which can move horizontally with regard to the structure of the truck between the two extreme positions of FIGURES 2 and 4.

FIGURE 1 represents the normal working condition of the gantry when the position of the piston with regard to the cylinder of the hydraulic jack device 19, the direction of the pivoting parts 10 and 11, and the height of the leg 16 are such that the leg 16 does not rest on the rail 7 through its saddle 20. In this case, the truck is only supported by the wheels 3 to 6.

FIGURE 2 represents the case when the hydraulic jack device 19 has pushed apart the tops of the pivoting parts 10 and 11, this having the result of lifting of the truck.

FIGURE 3 represents an intermediate position of the travelling set, the saddle 20 there being only slightly lifted above the rail 7.

Figure 5:
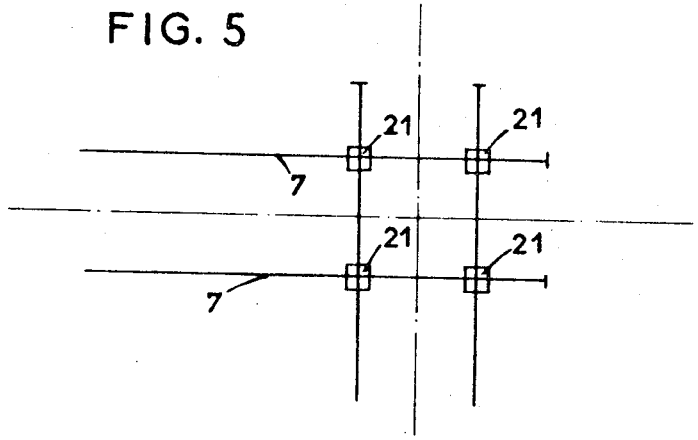
FIGURE 5 is a schematic view of two perpendicular rail trackways, showing how the bearing points of the vertical legs of each wheel assembly that are fitted on the truck should be positioned to allow the truck to pass from one rail track to another one at right angles to it.
Figure 6:
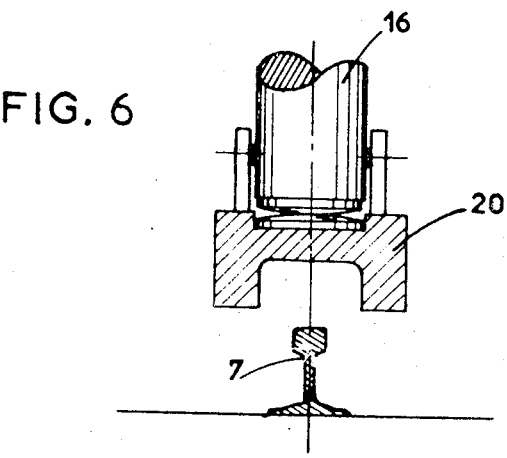
FIGURE 6 is a cross section in VI—VI of FIGURE 1.
Figure 7:
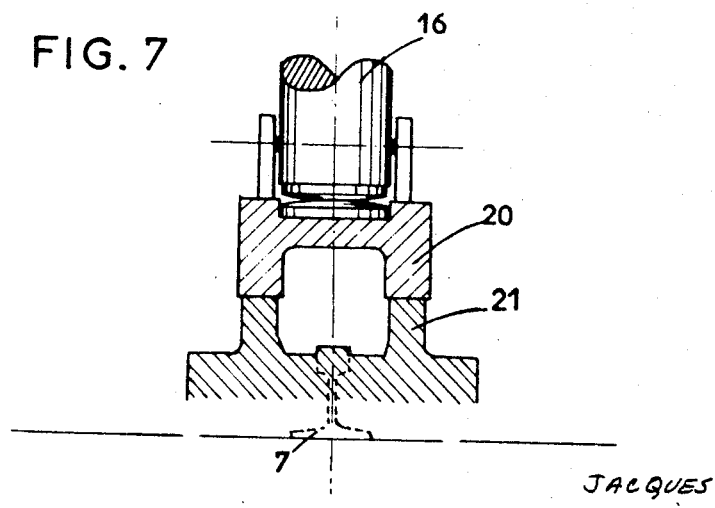
FIGURE 7 is a cross section similar to the one represented in FIGURE 6 showing the condition of FIGURES 4 and 5.

Finally, FIGURE 4 represents the saddle 20 of a leg 16 resting upon a bearing point 21, at the intersection points of the respective rails 7 of the intersecting trackways, and shows the condition when the truck assemblies are positioned as shown in FIGURE 5 with respect to perpendicular trackways.

When the four saddles 20 rest on the four special bearing points 21 that are located at the rail intersection points, and when the travelling sets are all lifted from rails 7 as represented on the FIGURE 4, these sets can be pivoted or rotated around their respective legs 16 to come above the rails 22 that are perpendicular to the rails 7; the travelling sets can then be lowered and the truck has then changed rail track rails 22.

It must be noted that by connecting through pipes the hydraulic jack devices 19 corresponding to the pairs of forward and rearward travelling sets, an equalization of the inequalities which can occur on the travelling tracks can be ensured.

Figure 8:
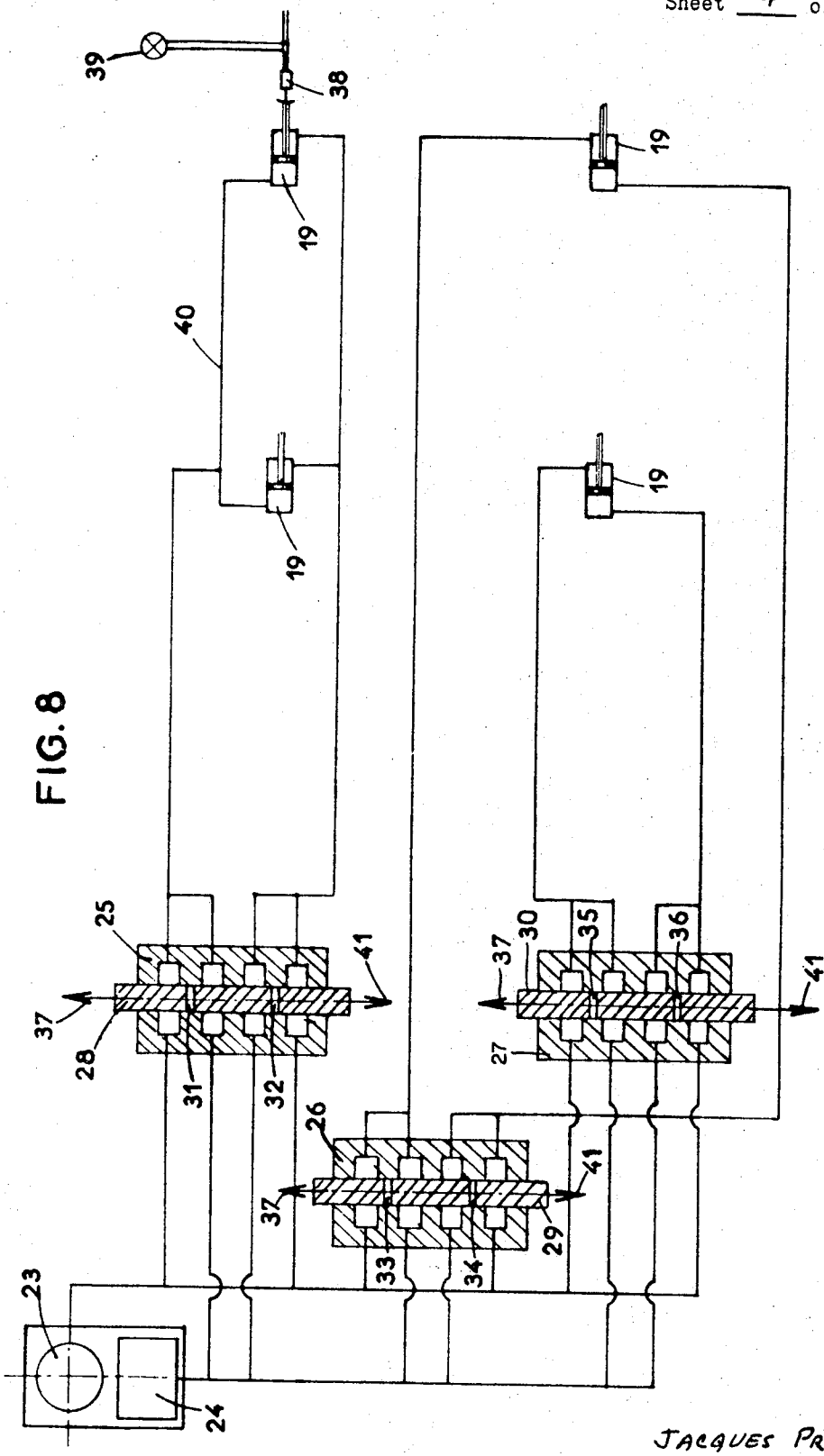
FIGURE 8 is a schematic view of the controls of the hydraulic jacks.
Figure 9:
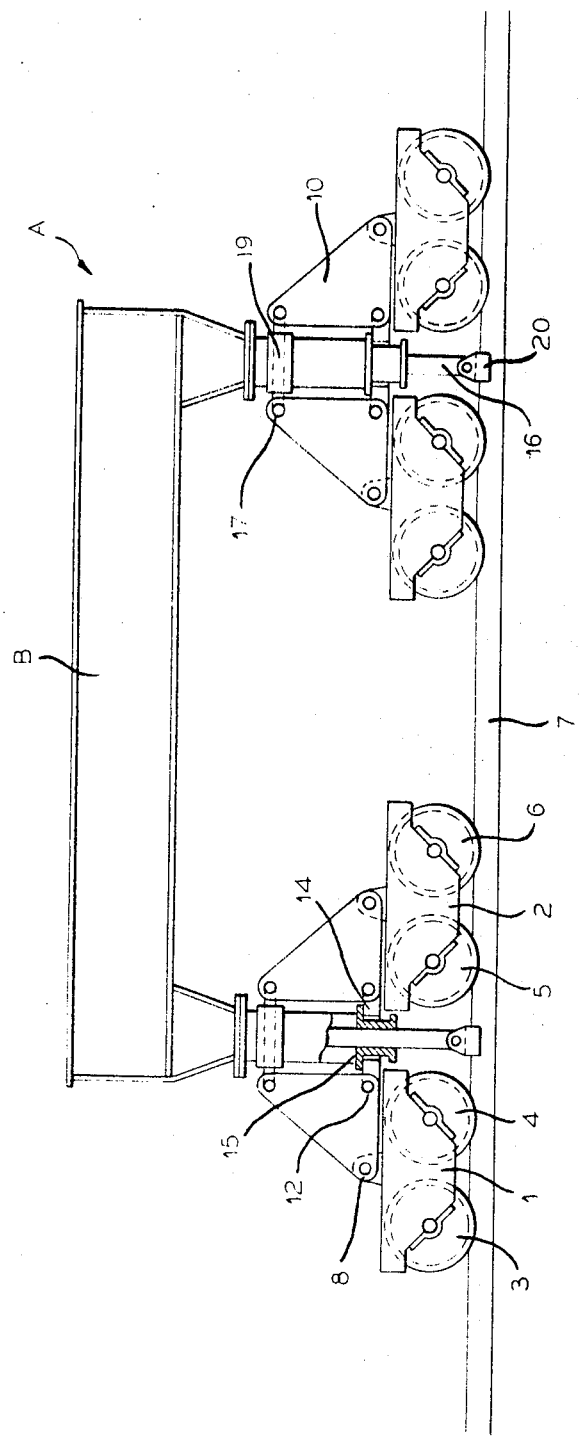
FIGURES 9 and 10 are respectively side elevational and end elevational views of the truck as equipped in accordance with this invention.
Figure 10:
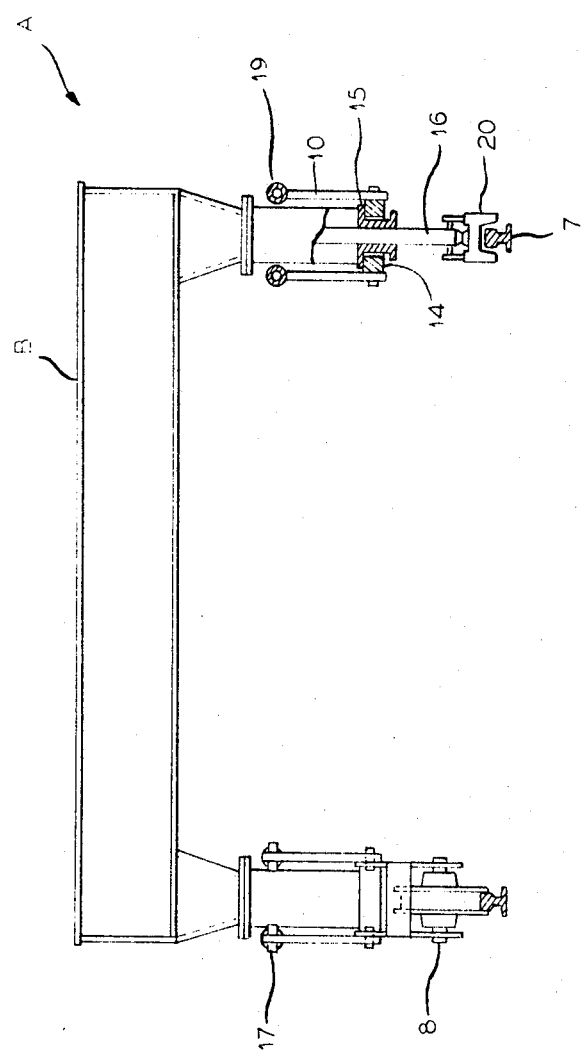

The FIGURE 8 represents a schematic example of an hydraulic diagram which may be used with the arrangement according to the invention, the hydraulic jack device of each traveling assembly being represented in this figure by a single cylinder diagram.

The diagram comprises a motor-pump unit 23 drawing liquid from a liquid receiving tank 24 and supplying it to three distributors 25, 26 and 27 having three positions. Each distributor comprises a piston 28, 29 and 30 provided with ducts 31, 32 or 33, 34 or 35, 36 allowing the flow of the liquid when these ducts face the corresponding distribution chambers.

The valve distributor 25 has a piston 28, which, when moved in the direction of the arrow 37 allows the simultaneous feeding of the two hydraulic jack devices 19 (controlled by same) corresponding to two travelling sets placed on each side of the rail track. The legs corresponding to these travelling sets are lifted till an appropriately positioned limit switch 38 shows, by the lighting up of a lamp 39, that the machine is in a working position. The hydraulic jack devices 19 then remain in hydraulic connection through a pipe 40.

For transferring the truck from one rail track to another, the truck is moved to the position of FIGURE 5 and the pistons 28, 29 and 30 are put in action by suitable controls in the direction of the arrows 37 so as to actuate jacks 19 to lift to a maximum the machine on its four legs, this lifting the four bogies to the position of FIGURE 4. After rotation of the travelling sets to alignment with the gantry is set on the rails by the action of the three valves 25, 26 and 27 by moving the pistons 28, 29 and 30 in the direction of the arrows 41, the legs 16 being lifted from the bearing points 21; the machine is then once more in a working position on the desired trackway.

The control of the valves 25, 26 and 27 may be operated by hand or through electro-magnets as part of automatic or semi-automatic controls.

The invention, of course, is not limited by details of the application which have been described above as these details could be modified without getting out of the field of the invention.

I claim:
1. In a rail vehicle truck adapted to ride on the rails of a two rail trackway and including a frame adapted to carry a load, the improvement for transferring the truck to another two rail trackway of the same guage that is disposed perpendicular to the first-mentioned trackway at the point of intersection of the trackways, said improvement comprising:
   said truck including first and second pairs of spaced apart legs positioned on either side thereof to be disposed in vertical alignment with the respective track rails when the truck is positioned on the track,
   said legs being positioned for vertical alignment with the respective intersection points of the rails of the trackways,
   and a wheel assembly adjacent the lower end of each leg for supporting the respective truck legs on the respective track rails,
   said wheel assemblies each comprising:
   a pair of bogies positioned on either side of the respective legs and each bogie including wheel means adapted to ride on the truck rails when the truck is on one of the trackways,
   said bogies of each leg being connected thereto and to each other for simultaneous rotational positioning about the longitudinal axis of the respective legs when said wheel means thereof are free of the track rails,
   a bell crank member for each bogie of the respective bogie pairs having one arm thereof pivotally connected to the bogie and the other arm thereof projecting upwardly and disposed adjacent the leg supporting same;
   said bell crank members of each bogie pair being aligned longitudinally of said bogies of each pair of bogies,
   jack means connecting said other arms of the respective bell crank members of the respective bogie pairs,
   means for pivotally restraining the portions of the respective bell crank members that are intermediate the respective arms thereof against movement laterally of the respective legs,
   and means for expanding and contracting said jack means to actuate the respective bell crank members of the respective legs to alternately rest said bogies of the respective legs on the respective rails and space said legs above same or rest said legs on said rails with said wheel means of the respective bogies spaced above same,
   whereby, when the truck is positioned to dispose said legs in vertical alignment with the respective intersection points of the rails of the trackways at the point of intersection of the latter, said jack means may be actuated by said expanding and contracting means to rest said legs on said rail intersection points and space said bogie wheel means above the respective rails whereby said bogies may be swung from alignment with one of the trackways to the other, whereupon said expanding and contracting means may be actuated to rest said bogie wheel means on the other trackway and space said legs above same to transfer the truck between the trackways.
2. The improvement set forth in claim 1 wherein:
   said restraining means of each leg comprises a ring member encircling the respective legs with said bell crank members of the respective legs being pivotally connected to the respective ring members intermediate the arms of the respective bell crank members.
3. The improvement set forth in claim 1 including:
   control means operably connected with said expanding and contracting means for operating said jack means to dispose the truck frame in a level working position when the truck is on a portion of the trackway that is inclined with respect to the horizontal.

References Cited

UNITED STATES PATENTS

| 2,140,421 | 12/1938 | Fageol | 105—215 |
| 3,130,686 | 4/1964 | Fiechter et al. | 105—215 |
| 3,182,604 | 5/1965 | Foxx et al. | 105—215 |

ARTHUR L. LA POINT, *Primary Examiner.*

H. BELTRAN, *Assistant Examiner.*

U.S. Cl. X.R.

105—163, 215